Feb. 13, 1951 T. C. HOAD 2,541,699
METHOD AND MEANS OF PREPARING AND
PROJECTING MOVING PICTURES
Filed March 18, 1946 3 Sheets-Sheet 1
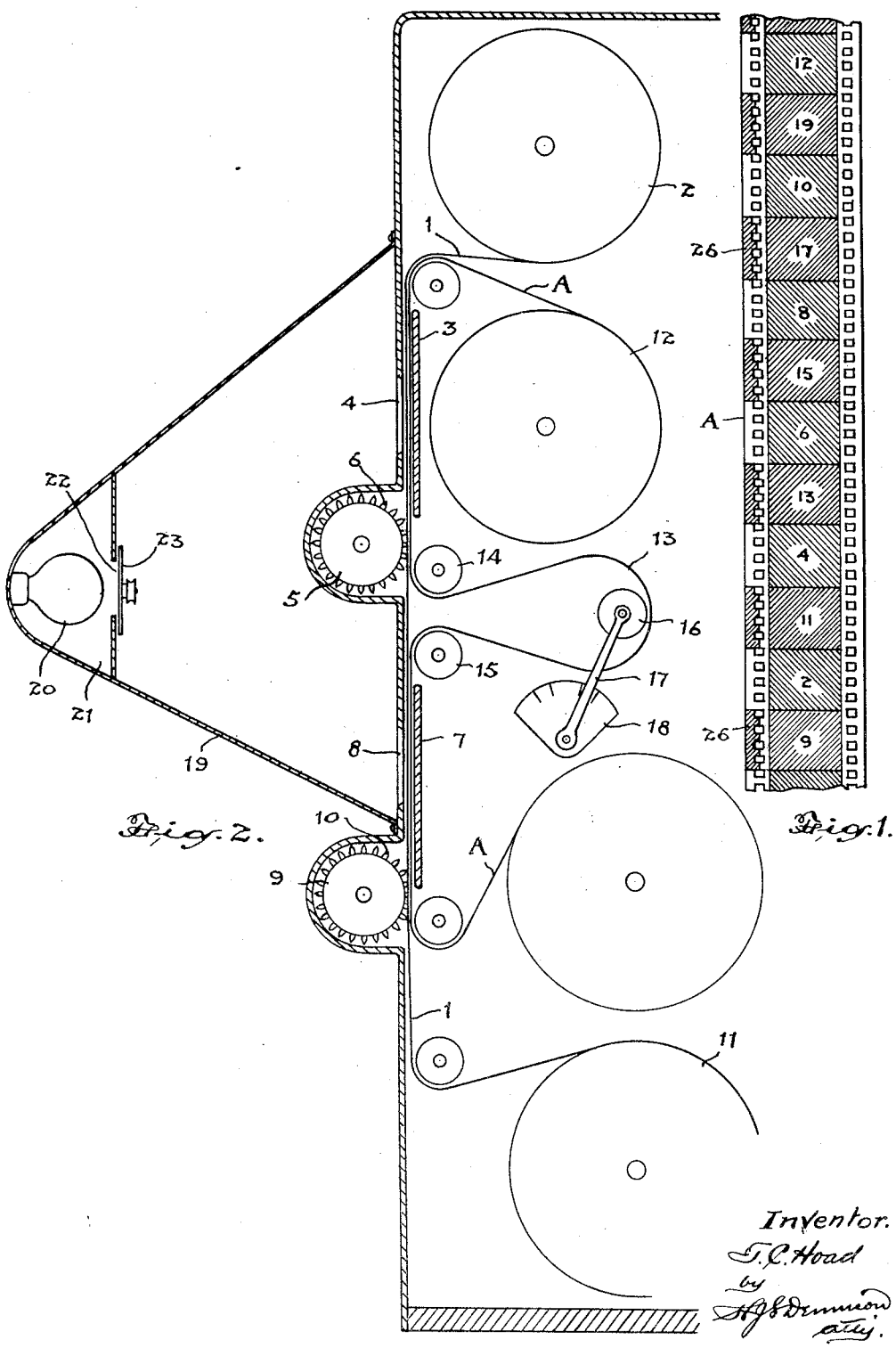
Inventor.
T.C. Hoad

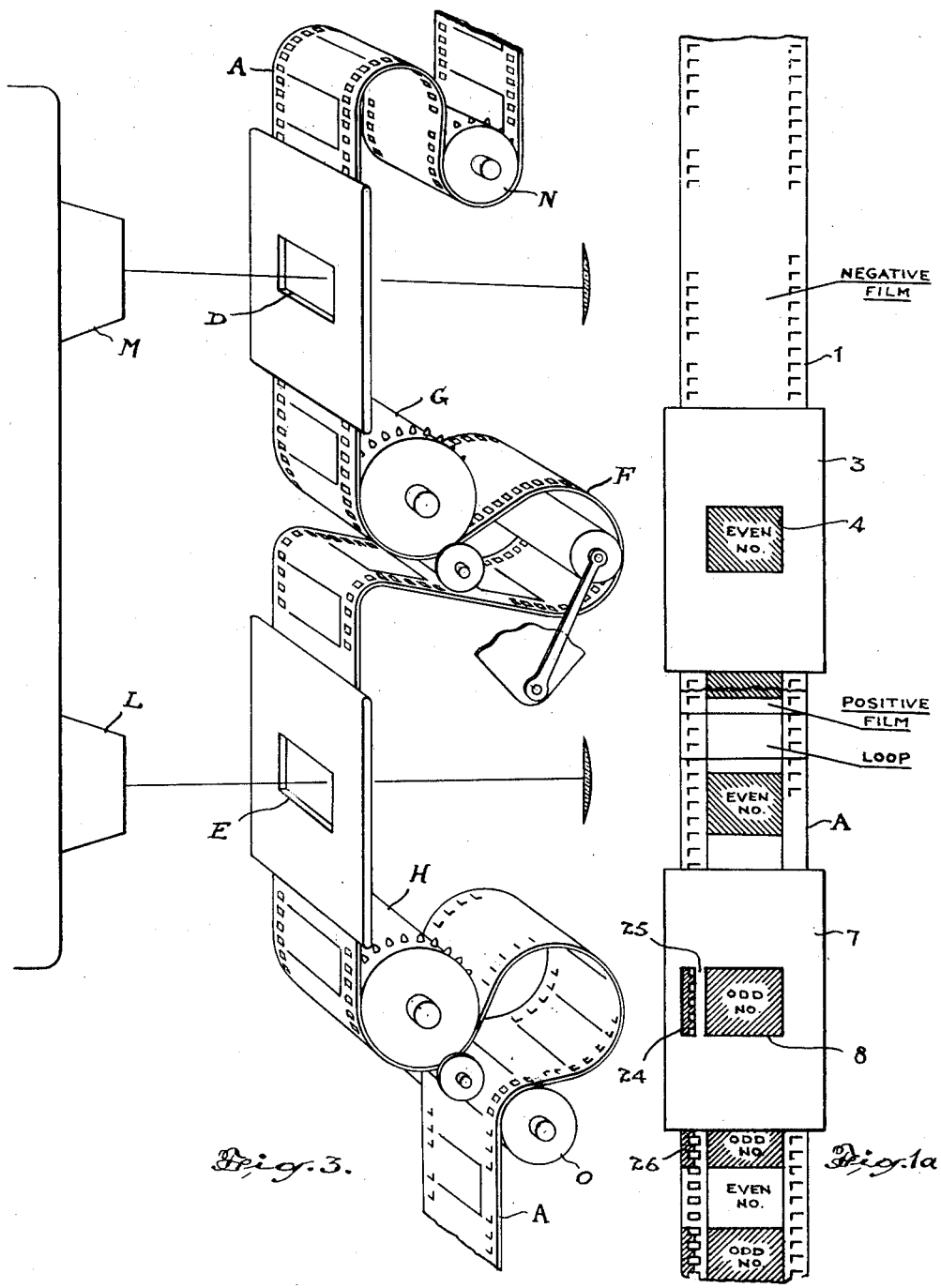

Feb. 13, 1951 — T. C. HOAD — 2,541,699
METHOD AND MEANS OF PREPARING AND PROJECTING MOVING PICTURES
Filed March 18, 1946 — 3 Sheets-Sheet 3
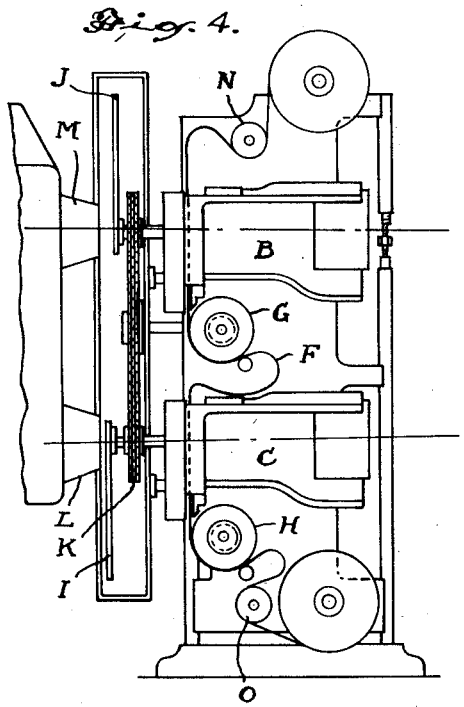
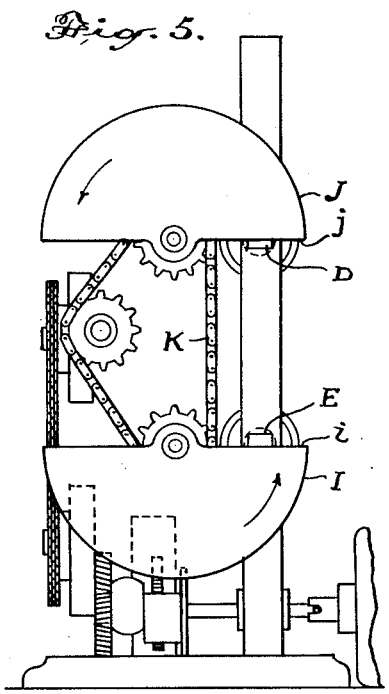
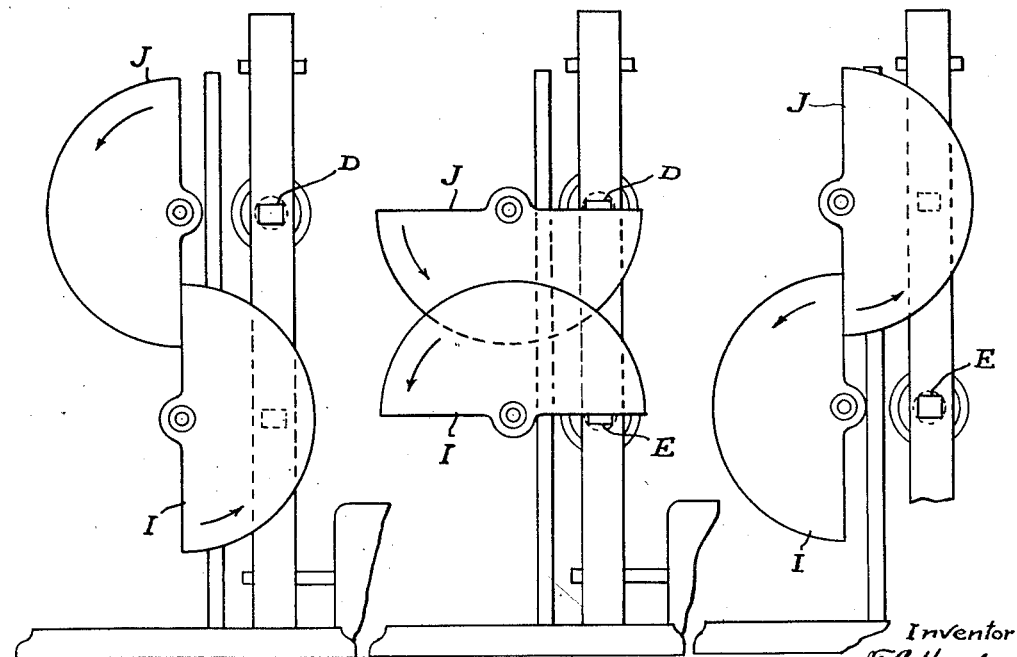
Fig. 4.   Fig. 5.   Fig. 6.   Fig. 7.   Fig. 8.
Inventor
T. C. Hoad Patented Feb. 13, 1951

2,541,699

UNITED STATES PATENT OFFICE 2,541,699

METHOD AND MEANS OF PREPARING AND PROJECTING MOVING PICTURES

Thomas C. Hoad, Toronto, Ontario, Canada

Application March 18, 1946, Serial No. 655,281

5 Claims. (Cl. 95—75)

This invention relates to a novel method of preparing and projecting moving pictures so that the successive pictures will be produced in a uniform progressive sequence and the principal objects of the invention are to produce the successive pictures on the film of uniform colour or density and project the pictures on to the screen so that there will be continuous illumination of the screen and the picture on the screen will flow smoothly with a uniform light effect which will eliminate flicker and eye strain and a slower and smoother operation of the projecting mechanism may be achieved.

A further object is to produce a film which may be easily and quickly matched in splicing and repairing and which will greatly simplify the threading of the film in the projector machine.

A still further object is to provide a simple and effective means for the printing of the film so that the successive pictures will be of uniform density.

The principal features of the invention consist in the novel manner of printing successive pictures in spaced-apart relation on a positive film simultaneouslly from a single light source producing pictures of uniform colour and density and each alternate "frame" or picture has a margin exposed at one side to present a "dark" margin while the intervening alternate pictures have a "light" margin, the film then being threaded into the projector machine in relation to a pair of projector members so that the "dark" margin "frames" or pictures will register with one projector apparatus and the "light" margin "frames" or pictures will register with the other projector aperture and successive pictures on the film are projected alternately from said paired projectors, and further in arranging and operating rotatable shutters to obstruct the light beam of one projector and move the film while the light beam from the other projector is being projected through a stationary film.

A still further feature of importance consists in operating the shutters of the pair of projector members so that one shutter will be operating to uncover the beam of light to be projected through a picture on a stationary portion of film while the other shutter is operating to cover the beam of light projected through another stationary picture on the film immediately prior to the movement of the film for another and progressive projection.

In the accompanying drawings Figure 1 is a diagrammatic illustration of a length of film printed in a particular manner in accordance with the present invention.

Figure 1a is a view similar to Figure 1 showing part of the negative film and showing the arrangement of the light orifices for printing alternate pictures with dark and light margins for directing film threading and splicing and repairing.

Figure 2 is a diagrammatic sectional view of a device for printing positive films in the particular manner required in accordance with this invention.

Figure 3 is a perspective diagrammatic illustration of the arrangement of the positive film in respect to a spaced pair of projectors.

Figure 4 is a diagrammatic side elevational view of a dual projector with the particular arrangement of shutters required in carrying this invention into effect.

Figure 5 is an elevational detail of the shutter arrangement of the dual projector of Figure 4.

Figure 6 is a diagrammatic detail of the shutter arrangement showing the lower of the projector orifices closed with the other open.

Figure 7 is a diagrammatic detail of the shutter mechanism showing both projector orifices half closed.

Figure 8 is a view similar to Figure 6 showing the arrangement of closed and open orifices reversed.

In the ordinary production and projection of motion pictures it is the practice to produce a negative in the camera and then print a positive directly therefrom which is then run through a single projector to produce the picture on a screen.

It is the purpose of this invention to use a dual projector and to project pictures through each projector alternately from a single positive film, the pictures to be alternately projected being spaced apart such a distance on the film and so arranged that when a portion of the film is stationary in one projector for the projection of one picture the other portion containing the next picture in the regular sequence as taken by the camera will be moved into position to be projected by the other projector.

In the preparation of a positive film in accordance with this invention the printing is accomplished in the manner illustrated in Figures 1 and 2. The negative film 1 is directed from the roll 2 through a guide or "film trap" 3 which has an exposure aperture 4 therein, which aperture is preferably the width of the picture or "frame" to be reproduced. Arranged below this aperture is an idler sprocket 5 the teeth 6 of which extend into the "film trap" and engage the feed apertures arranged parallel with the edges of the film.

A second "film trap" 7 arranged below the "trap" 3 is provided with an exposure aperture 8 and a sprocket 9 arranged below the aperture 8 has its teeth 10 engaging the feed apertures of the film and is operated with an intermittent movement to move the negative film the distance of two "frames" at a time and the aperture 8 is arranged so that the "frames" stopping through the intermittent movement of the film opposite the aperture 8 will be the "frames" intervening between the frames stopping opposite the aperture 4. These frames may be called, for convenience of description, odd and even numbered frames. The negative film extends directly, i. e. in a straight line, through the two film traps and is wound on the roll 11.

The positive film A to be printed wound on the roll 12 is fed through the trap 3 in surface contact with the negative film 1 and is then formed into an adjustable loop 13 passing around the spaced rollers 14 and 15, and the loop regulating roll 16 carried on a pivotal arm 17, which may be spring held in its outward position to gauge the size of the loop, by the notched spring plate 18 suitably supported. The positive film below the loop is again brought into surface contact with the negative and passes through the film trap 7 and the length of the loop 13 is such that "frames" of the positive film which do not stop opposite the light aperture 4 will stop opposite the aperture 8. The drive of the positive film is also obtained through the sprocket wheel 9.

Light is intermittently directed simultaneously through both apertures 4 and 8 during the periods when the films are at rest and in order to accomplish this a casing 19 is arranged enclosing both apertures 4 and 8 and a printing light 20 is arranged in an enclosure 21 which is provided with a light orifice 22. This orifice is intermittently opened and closed to admit light to the printing apertures 4 and 8 by a shutter 23 which is suitably connected to operate in synchronism with the film sprocket 9 so that the shutter opens the light orifice 22 when the films are at rest.

It will thus be understood that the positive film has printed upon it through the aperture 4 a succession of spaced apart "frames" termed even numbers and after being looped the positive film is again brought into register with the negative so that the properly succeeding "frames" of the negative will be printed on the intervening unprinted spaces. By this arrangement the successively numbered "frames" of the negative will be printed on the positive a considerable distance apart so that for instance, "frame" No. 10 on the positive film may appear between frames 17 and 19, thus the successive "frames" to be projected through spaced-apart projectors will be nine frames apart, which spacing will be the space between the projectors which are operated alternately as will be hereinafter shown.

It is an important feature of this invention that the odd and even numbered "frames" shall be readily determined by persons using the film, either in splicing, repairing or threading same in the projectors and in order to achieve this objective in a simple manner I propose to print each alternate frame of the positive film with a dark margin along the edge, that is, all odd number frames will have a dark margin while the even number frames have a light margin.

In order to accomplish this I provide a narrow aperture or slot 24 at one end of the exposure aperture 8 preferably spaced therefrom by a narrow bar 25 so that the boundary of the picture in the "frame" will not be fogged The light passing through this slot 24 when the film is being printed exposes the edge of the film at each alternate frame and the film thus presents a dark margin 26 which forms a definite guide for the operator to determine at a glance which is an even and which an odd numbered frame and piecing or splicing may be proceeded with without the necessity of magnifying the picture to determine the sequence The operator may use a simple form of spacing gauge, having a spacing equivalent to the spacing between consecutive pictures. This dark margin also enables the operator to easily and quickly thread the film in the dual projector used to ensure the right numbered "frame" being placed properly for projection.

In the illustration Figure 1a I show the positive film A as being exposed through the printing apertures 4 and 8, the negative being broken away below the aperture 4. The aperture 4 prints even numbered "frames" while the aperture 8 prints odd numbered "frames." It will of course be understood that the first part of a length of film need not be accurately printed, consequently the even numbered frames are first printed until the film passes through the loop 13 and reaches the aperture 8 when the intervening or odd number spaces are then printed between the even numbers and the sequence of the numbers are spaced well apart with a number of frames between the even number frames and the odd number frames of the picture sequence.

The positive film A thus produced is placed in a dual projector machine BC, as seen in Figure 4, having exposure apertures D and E respectively and between these apertures and their regulation frame structures the film is arranged to form a loop F of a suitable length to accommodate the intermittent movement of the film between the apertures as controlled by the sprocket member G which is operated by the mechanism of the projector B.

The film is threaded in position relative to the apertures of the projector so that when an even numbered "frame" containing a certain picture of the sequence is opposite aperture E and the beam of light is open to same, the odd numbered "frame" containing the next picture of the sequence will be moving into position opposite aperture D with the light beam closed. The threading of the film is facilitated by the arrangement of the alternating dark margins 26, the operator merely having to see that the dark margin frames register with one aperture while light margin frames register with the other aperture with the proper number of frames intervening as determined quickly by a scale or gauge.

The film-advancing mechanism is of standard design and is not shown in detail, the upper projector having the sprocket G and the lower projector having the sprocket H engaging the film and operating to move the film the distance of two frames at each intermittent operation.

Operatively connected with the projector mechanisms are the shutters I and J, here shown of semi-circular form and operatively connected to rotate in unison by a chain belt K.

As illustrated in Figure 5 the diametral edge i of the shutter I is arranged half way across the aperture E in its upward movement cutting off the beam of light from the light source L, Figure 4, and thereby closing off the picture projected from odd numbered "frame" on the film, while the diametral edge *j* of the shutter J is half way between the aperture D and uncovering the beam of light from the light source M to illuminate and project the picture from next in sequence even numbered "frame" of the film.

It will thus be seen that as the light beam projecting one picture is being cut off the light beam to illuminate the next picture is being released and the shutters I and J moving synchronously thus cover one picture and uncover the next succeeding picture without blacking out the screen at any period.

Immediately following the covering of the lower picture and while the upper picture is being shown, the film operating mechanism of the lower projector operates the sprocket H to move the film so that one odd numbered picture is moved away from the aperture E and the next odd numbered picture is moved into register with the aperture, while the shutter I covers the aperture. This occurs while the shutters are moving to and from the positions illustrated in Figure 6.

The continuing movement of the shutters then causes the uncovering of the beam of light through the lower aperture E by the shutter I and the covering of the aperture D by the shutter J, thus illuminating one aperture simultaneous with the closing off of the light beam to the other aperture.

The loop F of the film between the two projectors allows film to be taken therefrom in the operation of the sprocket H and in the succeeding operation of the sprocket G film is added to the loop.

The film is fed to the machine from the upper magazine by an upper sprocket N which operates at constant speed and below the sprocket H of the lower machine the film is fed by a sprocket O at constant speed to the regulation sound head from which the sound recordings are reproduced.

It will be appreciated that the film used in this invention is the ordinary standard film and is printed in the manner described and then placed in the dual projector to be illuminated as described.

With the arrangement of the picture "frames" as described and the co-related shutters operated as described the screen upon which the pictures are projected is continuously fully illuminated and consequently there are no "black out" periods and no flicker.

With the adoption of the present method of film printing and picture projection it will be found possible to effectively reduce the speed of operation of both cameras and projectors to approximately one-quarter the regular speed which will be highly beneficial as the wear of bearings and the intermittently moving parts in the machines and the wear on the film will be greatly reduced.

The shutter mechanism herein shown and described is of the rotary type but reciprocating shutter mechanisms of standard types may be used if desired.

What I claim as my invention is:

1. A method of preparing a film having sequential pictures of uniform density for projecting moving pictures consisting in printing sequential pictures in spaced apart relation on a tensioned film by exposing the positive film through a negative film lead without loop and under tension through adjacent separate apertures simultaneously illuminated for equal intervals at spaced intervals by the same source of light located at an equal distance from each of said apertures, the film and negative being moved intermittently the distance of two frames while said apertures are not illuminated with one aperture arranged to expose the alternate frames of said negative not exposed by the other aperture, the sequential pictures because of their simultaneous exposure to the same source of light being of equal density.

2. An apparatus for preparing a film for moving picture projection comprising a pair of closely spaced film traps arranged in alignment for the direct passage of a negative film under tension and without loop therethrough without compensation for film shrinkage, each of said traps having a light aperture, an idler sprocket for engaging and aligning a negative and positive film passing through the first trap, means for guiding a loop of the positive film between said traps while maintaining said positive loop under tension, means intermittently operated for drawing said films in alignment and under tension through said traps, and a single shutter mechanism synchronized with said intermittent film drawing means for directing light intermittently through the light apertures of both of said traps to light said apertures for precisely equal time intervals with light of uniform intensity and located at an equal distance from each of said apertures and colour temperature to effect a uniform exposure through said apertures.

3. A method of preparing film having sequential pictures of uniform density in spaced-apart relation for projecting through a dual moving projector consisting in leading a negative film directly without loop and under tension between two adjacent apertures arranged in close proximity to nullify effects of film shrinkage and spaced whereby one aperture exposes alternate frames of said negative not exposed by the other, leading a sensitive film between said apertures with a loop in said sensitive film inbetween said apertures while holding said looped sensitive film under tension throughout said loop and controlling said loop, illuminating said apertures for an equal interval at spaced intervals with a single light source located at an equal distance from each of said apertures to provide light of the same intensity and colour temperature at said two apertures directed at said tensioned film to print sequential pictures in spaced-apart relation, and advancing said film a distance of two frames during the intervals said apertures are not illuminated.

4. A method of preparing a film having sequential pictures of uniform density in spaced-apart relation for projecting through a dual moving picture projector consisting in leading a negative and a sensitive film between two adjacent apertures while maintaining said film under tension, one of said apertures arranged to expose odd-numbered frames of the negative film and the other to expose even-numbered frames of the negative film, intermittently illuminating said apertures by a single light source controlled by a single shutter and spaced an equal distance from each of said apertures to illuminate said apertures at spaced intervals for precisely the same duration and with light of the same intensity and colour temperature, said negative film being led directly without looping between said apertures and said sensitive film being lead through a control loop maintained under tension between said apertures to print sequential pictures in spaced-apart relation on said sensitive film, and advancing said negative and sensitive film through a distance of two frames during the interval said apertures are not illuminated.

5. An apparatus for preparing a film for moving picture projection comprising a casing, a pair of film traps opening from said casing and arranged in alignment, means intermittently operated for feeding a negative film under tension and without loop between said film traps the distance of two frames at a time, said traps being closely spaced the one to expose alternate frames of said negative not exposed by the other without compensation for film shrinkage, means feeding a positive film between said film traps, a roller swingably supported without said casing and engaging a loop of positive film extending between said film traps beneath said negative film to maintain said positive film loop under tension while permitting printing of sequential pictures in spaced apart relation on said positive film through said film traps, a single light source arranged within said casing and spaced equidistant from said film traps, a shutter mechanism arranged in said casing synchronized with said intermittent film feeding means for directing light through said traps to project light of equal density and uniform colour temperature through said tensioned film exposed through said traps.

THOMAS C. HOAD.

REFERENCES CITED

The following references are of record in the file of this patent:

UNITED STATES PATENTS

| Number | Name | Date |
| --- | --- | --- |
| 970,614 | Dyer et al. | Sept. 20, 1910 |
| 1,161,910 | Ulysse | Nov. 30, 1915 |
| 1,213,037 | Thornton | Jan. 16, 1917 |
| 1,320,145 | Hunt | Oct. 28, 1919 |
| 1,323,767 | Hunt | Dec. 2, 1919 |
| 1,335,860 | Shapiro | Apr. 6, 1920 |
| 1,409,628 | Wescott | Mar. 14, 1922 |
| 1,583,108 | Ball | May 4, 1926 |
| 1,583,769 | Aller | May 11, 1926 |
| 1,591,466 | Capstaff | July 6, 1926 |
| 1,634,297 | Miller | July 5, 1927 |
| 1,704,124 | Fiedler | Mar. 5, 1929 |
| 1,802,530 | Pilny et al. | Apr. 28, 1931 |
| 1,840,524 | Peck | Jan. 12, 1932 |
| 1,852,894 | Owens | Apr. 5, 1932 |
| 2,049,694 | Eggert et al. | Aug. 4, 1936 |